United States Patent
Morioka et al.

(10) Patent No.: US 12,302,291 B2
(45) Date of Patent: *May 13, 2025

(54) COMMUNICATION DEVICE AND COMMUNICATION METHOD

(71) Applicant: Sony Group Corporation, Tokyo (JP)

(72) Inventors: Yuichi Morioka, Tokyo (JP); Yusuke Tanaka, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,895

(22) Filed: Jul. 21, 2023

(65) Prior Publication Data

US 2023/0362894 A1 Nov. 9, 2023

Related U.S. Application Data

(63) Continuation of application No. 16/973,389, filed as application No. PCT/JP2019/021904 on Jun. 3, 2019, now Pat. No. 11,737,056.

(30) Foreign Application Priority Data

Jun. 15, 2018 (JP) .................................. 2018-114253

(51) Int. Cl.
*H04W 72/02* (2009.01)
*H04W 8/24* (2009.01)
(Continued)

(52) U.S. Cl.
CPC ............. *H04W 72/02* (2013.01); *H04W 8/24* (2013.01); *H04W 72/0453* (2013.01); *H04W 72/21* (2023.01)

(58) Field of Classification Search
CPC . H04W 72/02; H04W 72/21; H04W 72/0453; H04W 8/24
See application file for complete search history.

(56) References Cited

U.S. PATENT DOCUMENTS

| 9,673,873 B2 * | 6/2017 | Ode | ..................... H04B 7/022 |
| 2009/0016261 A1 * | 1/2009 | Laroia | .................. H04W 16/14 |
| | | | 370/328 |

(Continued)

FOREIGN PATENT DOCUMENTS

| JP | H04053663 B2 | 8/1992 |
| JP | 2000-022691 A | 1/2000 |

(Continued)

OTHER PUBLICATIONS

International Search Report and English translation thereof mailed Aug. 13, 2019 in connection with International Application No. PCT/JP2019/021904.

(Continued)

*Primary Examiner* — Brian D Nguyen
(74) *Attorney, Agent, or Firm* — Wolf, Greenfield & Sacks, P.C.

(57) ABSTRACT

The present technology relates to a communication device and a communication method capable of realizing more efficient communication.

There is provided a communication device including a base station including a control section configured to determine whether an existing standard-compliant terminal is connected to the base station in a usage frequency band that is a frequency band to be used by the base station on the basis of existing standard-compliant terminal connection information that indicates whether the existing standard-compliant terminal is connected to the base station in a predetermined frequency band and that is received from another base station. The present technology is applicable to, for example, a wireless LAN system.

20 Claims, 15 Drawing Sheets

(51) Int. Cl.
*H04W 72/0453* (2023.01)
*H04W 72/21* (2023.01)

(56) References Cited

U.S. PATENT DOCUMENTS

| | | | |
|---|---|---|---|
| 2010/0103912 A1 | 4/2010 | Suzuki | |
| 2011/0110349 A1 | 5/2011 | Grandhi | |
| 2016/0066204 A1* | 3/2016 | Khawer | H04W 72/542 |
| | | | 455/500 |
| 2017/0055262 A1* | 2/2017 | Nakamura | H04W 72/0453 |
| 2017/0079029 A1* | 3/2017 | Peng | H04W 72/21 |
| 2017/0288748 A1 | 10/2017 | Lou et al. | |
| 2019/0124533 A1* | 4/2019 | Tenny | H04L 5/0091 |
| 2019/0327057 A1* | 10/2019 | Wu | H04W 72/0453 |
| 2019/0363758 A1* | 11/2019 | Shichino | H04B 5/48 |
| 2021/0250907 A1 | 8/2021 | Morioka et al. | |

FOREIGN PATENT DOCUMENTS

| | | |
|---|---|---|
| JP | 2008-277883 A | 11/2008 |
| JP | 2008-278263 A | 11/2008 |
| JP | 2015-534418 A | 11/2015 |
| JP | 2017535107 A | 11/2017 |
| WO | WO 2016/028032 A1 | 2/2016 |
| WO | WO 2016-195442 A1 | 12/2016 |

OTHER PUBLICATIONS

[No Author Listed], IEEE P802.11n/D2.00 Draft STANDARD for Information Technology—Telecommunications and Information Exchange Between Systems—Local and Metropolitan Area Networks—Specific Requirements. Feb. 28, 2007. 498 pages.

[No Author Listed], IEEE P802.11nTM/D2.02. Draft STANDARD for Information Technology—Telecommunications and information exchange between systems—Local and metropolitan area networks—Specific Requirements—Par 11: Wireless LAN Medium Access Control (MAC) and Physical Layer (PHY) specifications: Amendment 4: Enhancements for Higher Throughput. IEEE P802.11nTM/D2.02. May 2007. 488 pages.

Tanaka et al., Discussion on EHT PAR Construction. IEEE 802.11-18/1912r1. Nov. 15, 2018. 9 pages.

Cisco Systems, Inc. et al., "Greenfield protection mechanism" [online], IEEE 802.11-06/1513r1, IEEE, Sep. 20, 2006 and pp. 1-9.

Cisco Systems, Inc., "Legacy Protection Mechanism—Proposed text changes" [online], IEEE P802.11 Wireless LANs, Nov. 16, 2006, pp. 1-5.

LAN/WAN Standards Committee, "IEEE Standard for Information technology—Telecommunications and information exchange between systems Local and metropolitan area networks—Specific requirements—Part 11: Wireless LAN Medium Access Control (MAC) and Physical Layer (PHY) Specifications [online]", IEEE Std 802.11-2016, Dec. 14, 2016, pp. 950-954 and 1440-1445.

* cited by examiner

FIG. 9

| | A | B | C | D |
|---|---|---|---|---|
| AP1 | × | ×(GFO) | ×(non-GFO) | GFO |
| AP3 | × | GFO | non-GFO | non-GFO |
| DETERMINATION OF AP2 | S102:「YES」 | S104:「YES」 | S106:「YES」 | S106:「NO」 |

COMMUNICATION DEVICE AND COMMUNICATION METHOD

CROSS-REFERENCE TO RELATED APPLICATIONS

The present application claims the benefit under 35 U.S.C. § 120 as a continuation application of U.S. application Ser. No. 16/973,389, filed on Dec. 8, 2020, now U.S. Pat. No. 11,737,056, which claims the benefit under 35 U.S.C. § 371 as a U.S. National Stage Entry of International Application No. PCT/JP2019/021904, filed in the Japanese Patent Office as a Receiving Office on Jun. 3, 2019, which claims priority to Japanese Patent Application Number JP2018-114253, filed in the Japanese Patent Office on Jun. 15, 2018, each of which applications is hereby incorporated by reference in its entirety.

TECHNICAL FIELD

The present technology relates to a communication device and a communication method, and particularly relates to a communication device and a communication method capable of realizing more efficient communication.

BACKGROUND ART

In recent years, with dissemination of a wireless LAN (Local Area Network) system, allocation of a new frequency band subsequent to existing frequency bands such as 2.4-GHz and 5-GHz bands has been studied in various countries.

At a time of developing a standard in which a new frequency band is supposed, it is also supposed to incorporate a framework for coexistence with an existing standard-compliant terminal compliant with a standard developed for an existing frequency band into the standard. PTL 1, for example, discloses a technology related to enabling an existing standard-compliant terminal.

CITATION LIST

Patent Literature

[PTL 1]
Japanese Translation of PCT International Application Publication No. 2017-535107

SUMMARY

Technical Problem

Meanwhile, at a time of allocation of a new frequency band in a wireless LAN system, a technology for realizing more efficient communication is required.

The present technology has been achieved in light of such circumstances, and an object of the present technology is to allow realization of more efficient communication.

Solution to Problem

A communication device according to a first aspect of the present technology is a communication device including a base station, the communication device including a control section configured to determine whether an existing standard-compliant terminal is connected to the base station in a usage frequency band that is a frequency band to be used by the base station on the basis of existing standard-compliant terminal connection information that indicates whether the existing standard-compliant terminal is connected to the base station in a predetermined frequency band and that is received from another base station.

A communication method according to the first aspect of the present technology is a communication method including, by a communication device including a base station, determining whether an existing standard-compliant terminal is connected to the base station in a usage frequency band that is a frequency band to be used by the base station on the basis of existing standard-compliant terminal connection information that indicates whether the existing standard-compliant terminal is connected to the base station in a predetermined frequency band and that is received from another base station.

In the communication device and the communication method according to the first aspect of the present technology, it is determined whether the existing standard-compliant terminal is connected to the base station in the usage frequency band that is the frequency band to be used by the base station on the basis of existing standard-compliant terminal connection information that indicates whether the existing standard-compliant terminal is connected to the base station in the predetermined frequency band and that is received from the other base station.

A communication device according to a second aspect of the present technology is a communication device including a subordinate terminal connected to a base station, the communication device including a control section configured to exercise control in such a manner that existing standard-compliant terminal connection information that indicates whether an existing standard-compliant terminal is connected to the base station in a predetermined frequency band and that is received from another base station is transmitted to the base station.

A communication method according to the second aspect of the present technology is a communication method including, by a communication device including a subordinate terminal connected to a base station, exercising control in such a manner that existing standard-compliant terminal connection information that indicates whether an existing standard-compliant terminal is connected to the base station in a predetermined frequency band and that is received from another base station is transmitted to the base station.

In the communication device and the communication method according to the second aspect of the present technology, control in such a manner that the existing standard-compliant terminal connection information that indicates whether the existing standard-compliant terminal is connected to the base station and that is received from the other base station is transmitted to the base station is executed.

The communication devices according to the first and second aspects of the present technology may be independent devices or may be internal blocks that configure one device.

Advantageous Effect of Invention

According to the first and second aspects of the present technology, it is possible to realize more efficient communication.

It is noted that advantageous effect is not always limited to those described herein but may be any advantageous effect described in the present disclosure.

BRIEF DESCRIPTION OF DRAWINGS

FIG. 4 is a diagram depicting a format of a PPDU defined in standard IEEE802.11a.

FIG. 9 is a diagram depicting an example of determination in a base station AP2 based on information from base stations AP1 and AP3.

DESCRIPTION OF EMBODIMENTS

Embodiments of the present technology will be described hereinafter with reference to the drawings. It is noted that the present disclosure will be described in the following order.
1. Embodiment of Present Technology
2. Modifications 1. Embodiment of Present Technology (Example of Configurations of Wireless Communication System)

Figure 1:
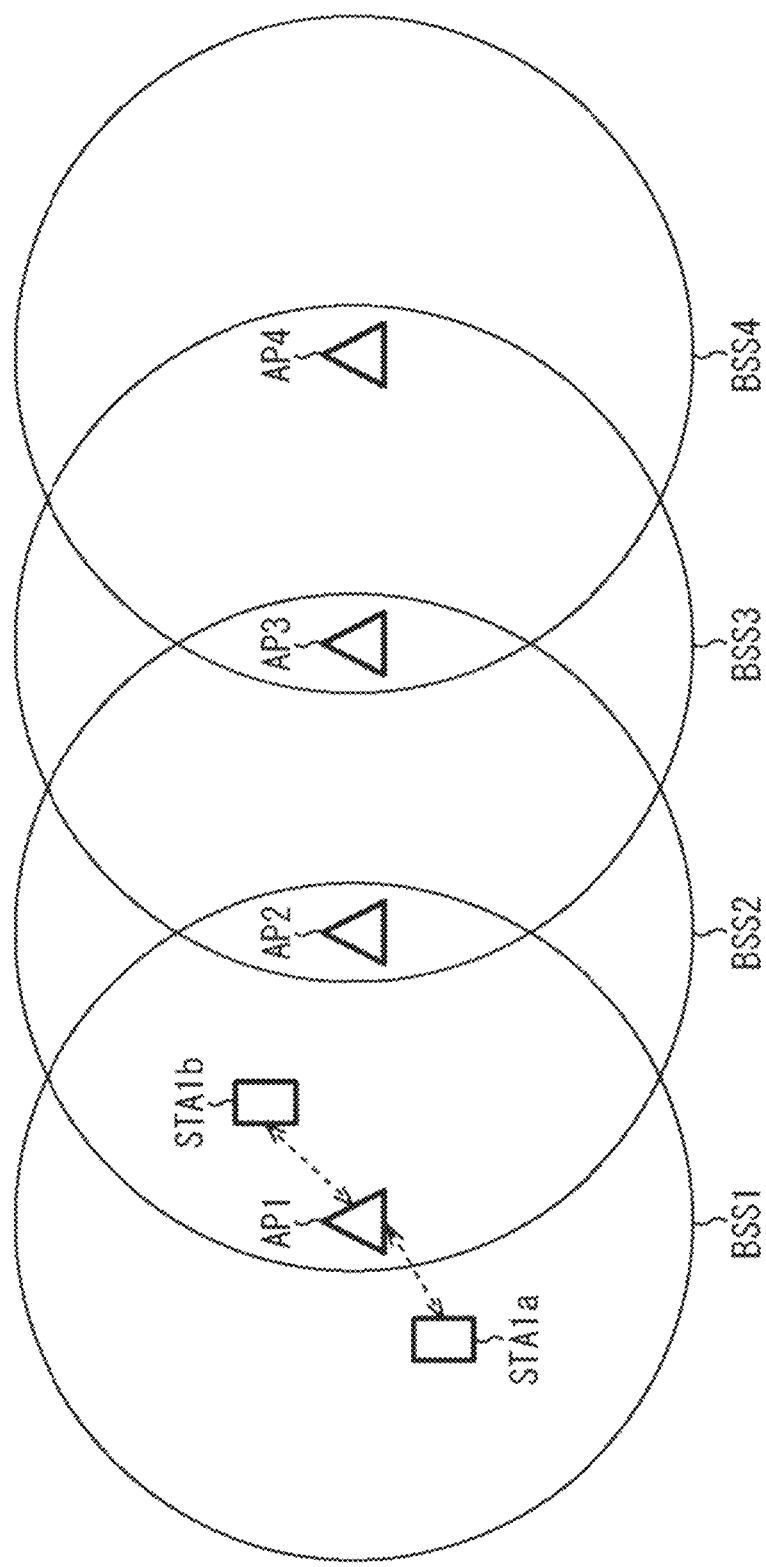
FIG. 1 is a diagram depicting an example of configurations of a wireless communication system.

FIG. 1 is a diagram depicting an example of configurations of a wireless communication system.

In FIG. 1, the wireless communication system is a wireless LAN (Local Area Network) system configured with a plurality of networks (BSSs: Basic Service Sets) including base stations (APs: Access Points) and subordinate terminals (STAs: Stations) connected to the base stations.

A base station AP1 and subordinate terminals STA1*a* and STA1*b* connected to the base station AP1 configure a network BSS1. It is noted that dotted lines connecting the base station AP1 to the subordinate terminals STA1*a* and STA1*b* indicate that the subordinate terminals STA1*a* and STA1*b* are connected to the base station AP1. In addition, although not depicted, subordinate terminals STAs are connected to base stations AP2 to AP4 similarly to the base station AP1, and the base stations AP2 to AP4 and the subordinate terminals connected to the base stations AP2 to AP4 configure networks BSS2 to BSS4, respectively.

A solid line circle around each base station AP indicates a communicable range of each base station AP, that is, a signal arrival range and a signal detection range thereof. The communicable ranges of the base stations APs may overlap, in some cases. In FIG. 1, for example, the communicable range of the base station AP2 includes the base stations AP1 and AP3.

It is noted that the configurations of the wireless communication system depicted in FIG. 1 are given as an example and the numbers and arrangement of the base stations APs, the subordinate terminals STAs, and the networks BSS are not limited to those in the example of FIG. 1.

(Example of Configurations of Communication Device)

Figure 2:
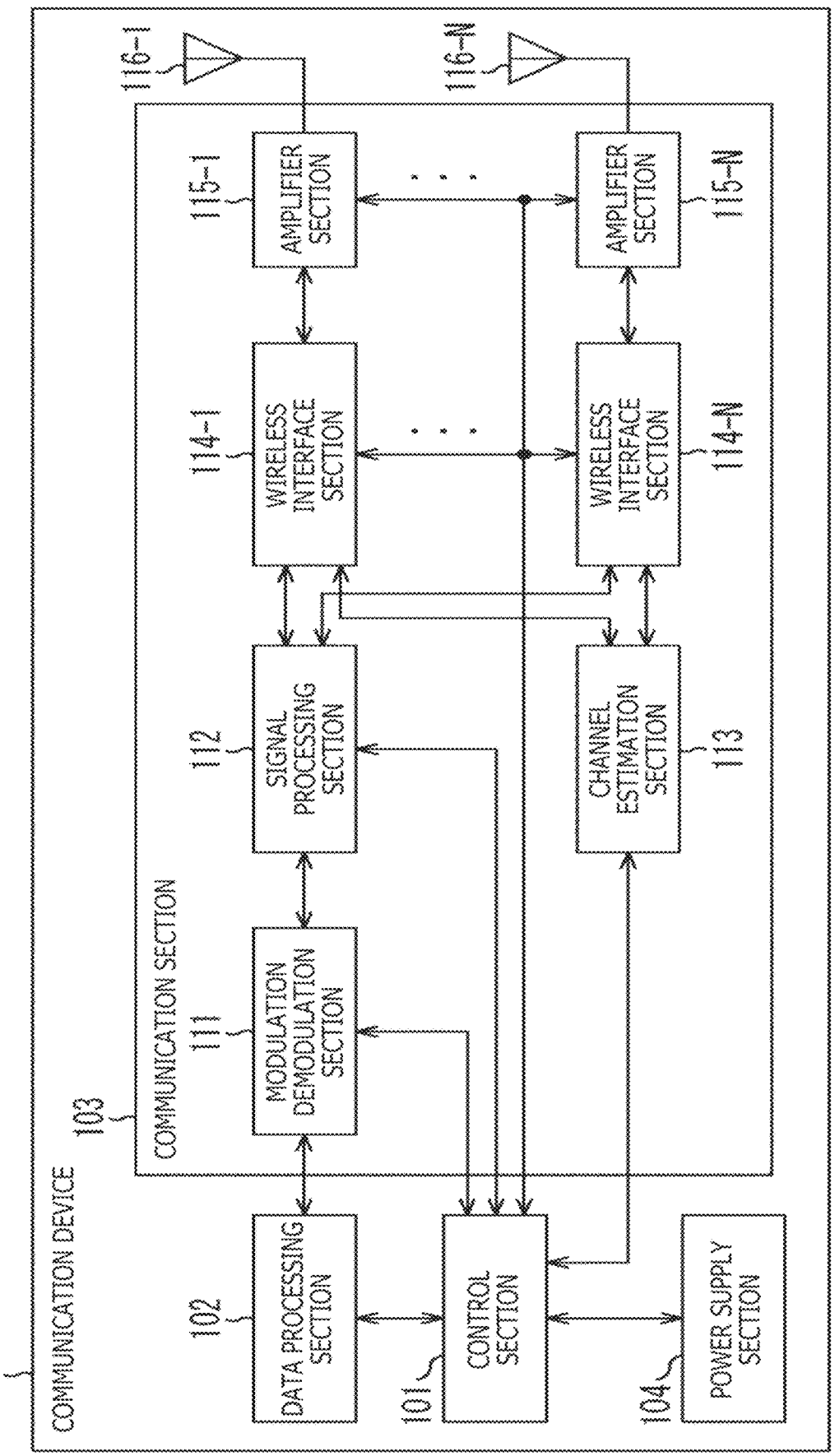
FIG. 2 is a block diagram depicting an example of configurations of a communication device according to one embodiment to which the present technology is applied.

FIG. 2 is a block diagram depicting an example of configurations of a communication device (wireless communication device) according to one embodiment to which the present technology is applied.

A communication device 10 depicted in FIG. 2 is configured as one base station AP or one subordinate terminal STA in the wireless communication system of FIG. 1.

In FIG. 2, the communication device 10 includes a control section 101, a data processing section 102, a communication section 103, and a power supply section 104. Furthermore, the communication section 103 includes a modulation demodulation section 111, a signal processing section 112, a channel estimation section 113, wireless interface sections 114-1 to 114-N (where N is an integer equal to or greater than 1), and amplifier sections 115-1 to 115-N (where N is an integer equal to or greater than 1). Moreover, in the communication device 10, antennas 116-1 to 116-N (where N is an integer equal to or greater than 1) are provided to correspond to (the amplifier sections 115-1 to 115-N of) the communication section 103.

The control section 101 includes a processor such as, for example, a microprocessor and controls actions of the sections. In addition, the control section 101 performs delivery and receipt of information (data) to and from blocks.

Furthermore, the control section 101 performs packet scheduling in the data processing section 102 and parameter setting in the modulation demodulation section 111 and the signal processing section 112 of the communication section 103. Moreover, the control section 101 performs parameter setting of and transmitted power control over the wireless interface sections 114-1 to 114-N and the amplifier sections 115-1 to 115-N.

At a time of transmission at which data is input from a protocol upper layer, the data processing section 102 generates packets for wireless communication from the input data, performs processing such as addition of a header and addition of an error detection code for media access control (MAC) on each packet, and outputs processed data obtained as a result of the processing to (the modulation demodulation section 111 of) the communication section 103.

Furthermore, at a time of reception at which data is input from (the modulation demodulation section 111 of) the communication section 103, the data processing section 102 performs processing such as analysis of each MAC header, detection of a packet error, and reordering processing on the input data, and outputs processed data obtained as a result of the processing to the protocol upper layer.

The communication section 103 performs processing associated with wireless communication in accordance with control from the control section 101.

At the time of transmission, the modulation demodulation section 111 performs encoding, interleaving, modulation, and the like on the input data input from the data processing section 102 on the basis of coding and modulation schemes set by the control section 101, and outputs a data symbol stream obtained as a result of the processing to the signal processing section 112.

Furthermore, at the time of reception, the modulation demodulation section 111 performs opposite processing to that at the time of transmission, that is, processing such as demodulation, deinterleaving, and decoding on a data symbol stream input from the signal processing section 112 on the basis of coding and demodulation schemes set by the control section 101, and outputs processed data obtained as a result the processing to the control section 101 or the data processing section 102.

At the time of transmission, the signal processing section 112 performs processing such as signal processing used for space separation, as needed, on the data symbol stream input from the modulation demodulation section 111, and outputs one or more transmitted symbol streams obtained as a result of the processing to each of the wireless interface sections 114-1 to 114-N.

Moreover, at the time of reception, the signal processing section 112 performs processing such as signal processing for spatial resolution on a stream, as needed, on a received symbol stream input from each of the wireless interface sections 114-1 to 114-N, and outputs a data symbol stream obtained as a result of the processing to the modulation demodulation section 111.

The channel estimation section 113 calculates complex channel gain information regarding a propagation path from preamble parts and training signal parts among input signals from the wireless interface sections 114-1 to 114-N. The complex channel gain information calculated by the channel estimation section 113 is used in demodulation processing in the modulation demodulation section 111 and spatial processing in the signal processing section 112 via the control section 101.

At the time of transmission, the wireless interface section 114-1 converts the transmitted symbol stream input from the signal processing section 112 into an analog signal, performs processing such as filtering and upconversion into a carrier frequency, and outputs (transmits) a transmitted signal obtained as a result of the processing to the amplifier section 115-1 or the antenna 116-1.

Furthermore, at the time of reception, the wireless interface section 114-1 performs opposite processing to that at the time of transmission, that is, processing such as down-conversion on the received signal input from the amplifier section 115-1 or the antenna 116-1, and outputs a received symbol stream obtained as a result of the processing to the signal processing section 112.

At the time of transmission, the amplifier section 115-1 amplifies the transmitted signal (analog signal) input from the wireless interface section 114-1 up to predetermined power, and transmits the amplified transmitted signal (analog signal) to the antenna 116-1. In addition, at the time of reception, the amplifier section 115-1 amplifies the received signal (analog signal) input from the antenna 116-1 up to predetermined power, and outputs the amplified received signal (analog signal) to the wireless interface section 114-1.

It is noted that description of the wireless interface sections 114-2 to 114-N, the amplifier sections 115-2 to 115-N, and the antennas 116-2 to 116-N will be omitted herein since the wireless interface sections 114-2 to 114-N are configured similarly to the wireless interface section 114-1, the amplifier sections 115-2 to 115-N are configured similarly to the amplifier section 115-1, and the antennas 116-2 to 116-N are configured similarly to the antenna 116-1.

Moreover, in a case in which there is no need to particularly discriminate the wireless interface sections 114-1 to 114-N, each of the wireless interface sections 114-1 to 114-N will be referred to as a wireless interface section 114; in a case in which there is no need to particularly discriminate the amplifier sections 115-1 to 115-N, each of the amplifier sections 115-1 to 115-N will be referred to as an amplifier section 115; and in a case in which there is no need to particularly discriminate the antennas 116-1 to 116-N, each of the antennas 116-1 to 116-N will be referred to as an antenna 116.

Furthermore, at least either one of (at least part of) functions at the time of transmission or functions at the time of reception of each amplifier section 115 may be included in each wireless interface section 114. Moreover, at least either one of (at least part of) the functions at the time of transmission and the functions at the time of reception of each amplifier section 115 may be constituent elements outside of the communication section 103. Furthermore, each wireless interface section 114, each amplifier section 115, and each antenna 116 may be defined as one set, and the communication section 103 may include one or more sets as constituent elements.

The power supply section 104 includes a batter power supply or a fixed power supply and supplies power to the sections in the communication device 10.

While the communication device 10 configured as described above is configured as one base station AP (or one subordinate terminal STA) in the wireless communication system of FIG. 1, the control section 101 has, for example, the following functions to realize more efficient communication at a time of allocation of a new frequency band (for example, 6-GHz band). In other words, as described later in detail, the control section 101 controls actions of the sections in such a manner that an operation can be performed using a band confirmed by a search of a new frequency band (for example, 6-GHz band) on the basis of information from the surrounding base stations APs.

(Determination of 6-GHz Available Band by Information Sharing Among Base Stations)

Meanwhile, in recent years, with dissemination of the wireless LAN system, release of an unlicensed 6-GHz band in use applications starting at wireless LAN in a 6-GHz band subsequent to 2.4-GHz and 5-GHz bands has been studied in various countries (for example, the United States and European countries). Furthermore, to ensure acquisition of the 6-GHz band, the IEEE802.11 standardizing body declares that standard IEEE802.11ax currently under development is made available for the 6-GHz band as it is.

Since standard IEEE802.11ax for which standardization is underway since 2014 is developed for use in the 2.4-GHz and 5-GHz bands, a framework for coexistence with an existing standard-compliant terminal already present in any of these bands is incorporated into standard IEEE802.11ax.

Figure 3:
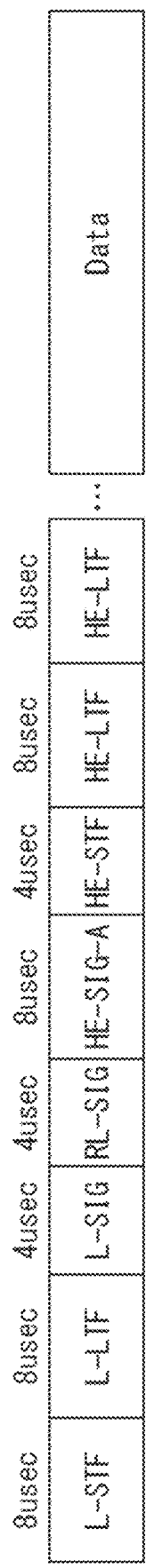
FIG. 3 is a diagram depicting a format of a PPDU defined in standard IEEE802.11ax.

FIG. 3 is a diagram depicting a format of a PPDU defined in standard IEEE802.11ax.

In a PPDU (PPDU: PLOP Protocol Data Unit, PLOP: Physical Layer Convergence Protocol) of FIG. 3, an L-STF, an L-LTF, an L-SIG, an RL-SIG, an HE-SIG-A, an HE-STF, an HE-LTF, and an HE-LTF are added to a data signal (Data).

The L-STF (Legacy Short Training Field), the L-LTF (Legacy Long Training Field), and the L-SIG (Legacy Signal Field) are added such that an existing standard-compliant terminal before IEEE802.11ax (for example, terminal compliant with standard IEEE802.11ac) recognizes that the pertinent PPDU is a signal in conformance with standards IEEE802.11 and refrains from transmission of an interference signal at a time of receiving the pertinent PPDU.

The RL-SIG (L-SIG repetition) subsequent to the L-SIG is added such that a terminal compliant with standard IEEE802.11ax recognizes that the pertinent PPDU is a signal in conformance with not standards before IEEE802.11ax but standard IEEE802.11ax at the time of receiving the pertinent PPDU.

Moreover, in addition to the format of the PPDU depicted in FIG. 3, there are many other frameworks for coexistence with an existing standard-compliant terminal incorporated into standard IEEE802.11ax.

Figure 4:
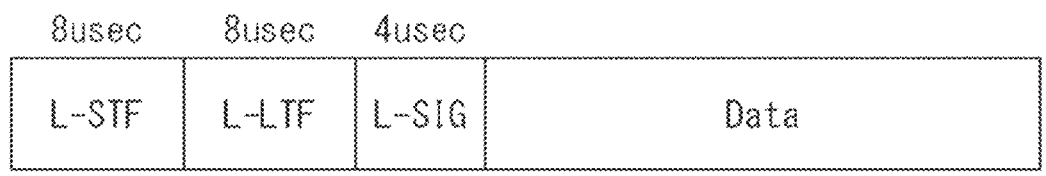

For example, it is necessary to transmit control information (for example, Control Frame, Management Frame, and the like) exchanged in a network (BSS) in a format of the PPDU depicted in FIG. 4 so that all terminals including existing standard-compliant terminals in the network (BSS) are capable of understanding the control information. In the PPDU of FIG. 4, the L-STF, the L-LTF, and the L-SIG are added to a data signal (Data).

Meanwhile, it is defined that standard IEEE802.11ax that remains including overhead for the coexistence with an existing standard-compliant terminal compliant with a standard before IEEE802.11ax is also available in a newly allocated 6-GHz band although the existing standard-compliant terminal is not present in the 6-GHz band. This is because preparing an operationally available standard in advance makes it possible to state to a regulator that it is possible to instantly make use of a newly allocated frequency band (6-GHz band) without blank periods when the frequency band (6-GHz band) is newly allocated.

Furthermore, since the framework for the coexistence with an existing standard-compliant terminal in this 6-GHz band is unnecessary overhead, it is predicted that a Greenfield operation (hereinafter, also referred to as a "GFO") which makes the framework unnecessary is studied in a standard succeeding IEEE802.11ax.

A Greenfield (GF) means that an existing standard-compliant terminal (legacy terminal) is not present, and an operation in which the existing standard-compliant terminal is not present is referred to as Greenfield operation (GFO). Meanwhile, in the following description, an operation in which an existing standard-compliant terminal (legacy terminal) is present will be referred to as non-Greenfield operation (non-GFO) to distinguish the non-GFO from the Greenfield operation (GFO). It is noted that the Greenfield operation (GFO) will be also referred to as first operation, and the non-Greenfield operation (non-GFO) will be also referred to as second operation.

Figure 5:
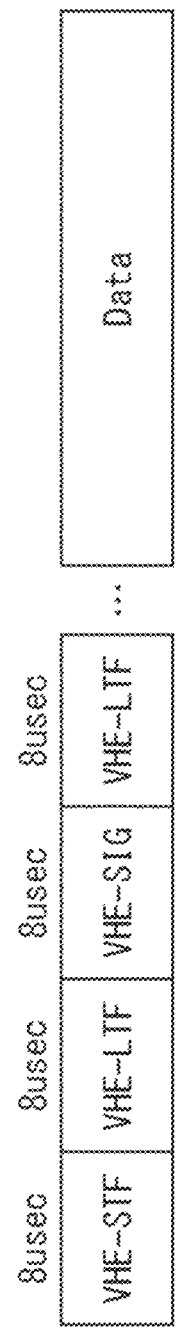
FIG. 5 is a diagram depicting a format of a Greenfield PPDU.

FIG. 5 is a diagram depicting a format of a Greenfield PPDU (hereinafter, also referred to as GF PPDU).

In the GF PPDU of FIG. 5, a VHE-STF, a VHE-LTF, a VHE-SIG, and a VHE-LTF are added to a data signal (Data). In other words, as depicted in FIG. 5, it is supposed that a GF PPDU only having bare minimum signal regions excluding signal regions such as the L-STF, the L-LTF, and the L-SIG is newly defined. It is noted that, in FIG. 5, "VHE" is an abbreviation of Very High Efficiency and a tentative name meaning a standard succeeding IEEE802.11ax.

It is noted herein that, in a case in which a terminal (terminal compliant with standard IEEE802.11ax) that can recognize only a PPDU to which the L-STF, the L-LTF, the L-SIG, and the RL-SIG defined in the standard IEEE802.11ax are added receives this GF PPDU, a probability arises that the terminal is incapable of correctly recognizing presence of the GF PPDU and induces a packet collision.

To address the problem, the present technology realizes efficient working of the Greenfield operation (GFO) by information sharing among the base stations APs. Specifically, the adjacent base stations APs are notified of whether or not an existing standard-compliant terminal (in this case, terminal compliant with standard IEEE802.11ax) is enabled in an available band that is a 6-GHz band by a frame depicted in FIG. 6.

Figure 6:
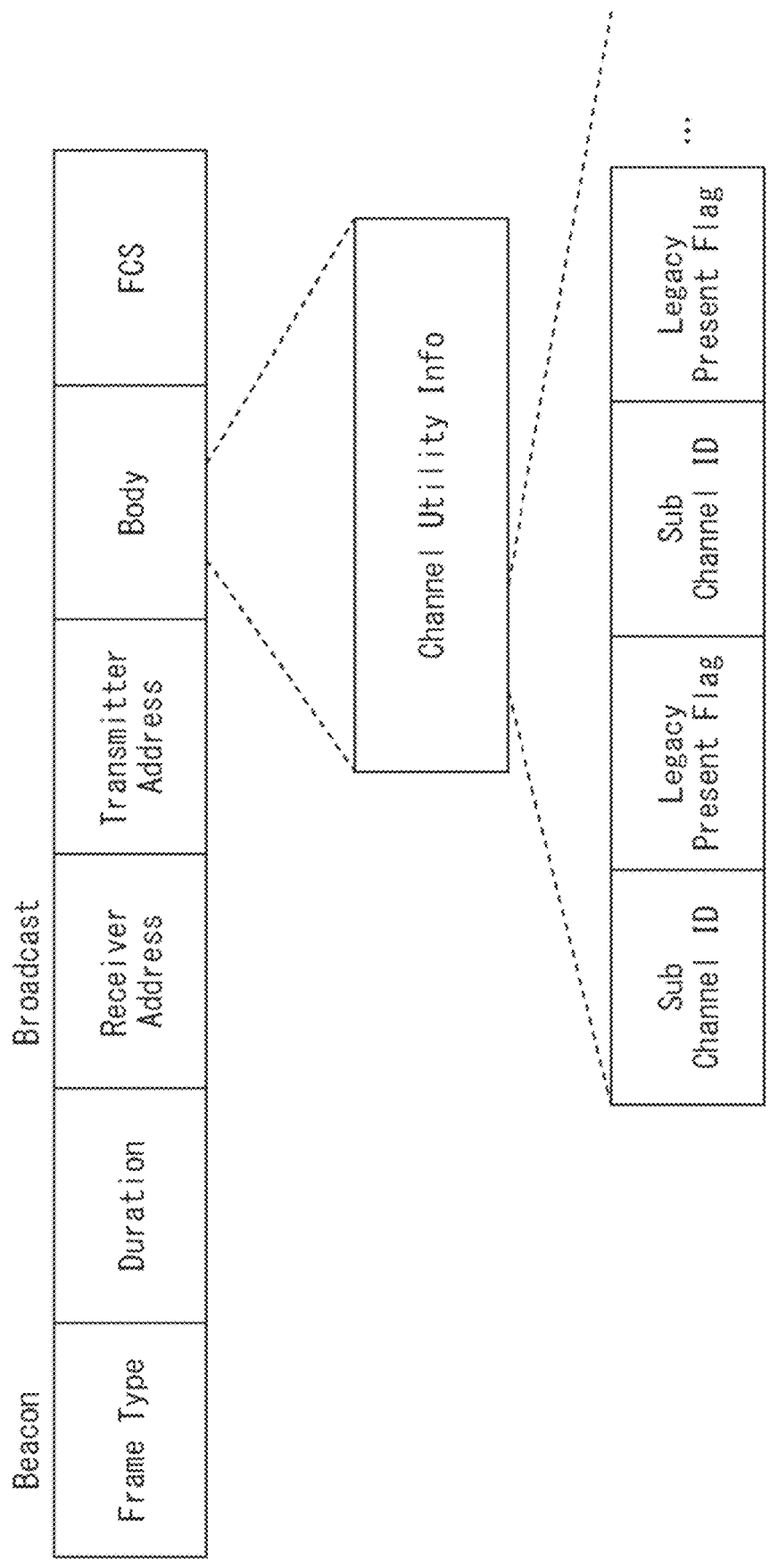
FIG. 6 is a diagram depicting a first example of a format of a frame in which 6-GHz band usage situation information is stored.

FIG. 6 is a diagram depicting a first example of a format of a frame in which 6-GHz band usage situation information is stored.

In FIG. 6, the frame storing therein the 6-GHz band usage situation information includes a Frame Type, a Duration, a Receiver Address, a Transmitter Address, a Body, and an FCS.

Information associated with a type of this frame is stored in the Frame Type. In a case, for example, in which the frame is transmitted as a Beacon Frame, information indicating Beacon is stored in the Frame Type.

Information associated with a length of this frame is stored in the Duration. Information associated with an address of a destination of this frame is stored in the Receiver Address. In a case, for example, of broadcast transmission of this frame, a Broadcast Address is stored in the Receiver Address.

Information associated with an address of a source of this frame is stored in the Transmitter Address. Specific information transmitted by this frame is stored in the Body. For example, the Body includes Channel Utility Info. Information associated with error detection/correction is stored in the FCS (Frame Check Sequence).

The Channel Utility Info includes a Sub Channel ID and a Legacy Present Flag. It is noted herein that the Sub Channel ID and the Legacy Present Flag are paired and the Channel Utility Info includes one or a plurality of pairs. Band identification information identifying a predetermined band (frequency band) per predetermined bandwidth (for example, 20 MHz, 40 MHz, or the like) in the 6-GHz band is stored in the Sub Channel ID. Furthermore, existing standard-compliant terminal connection information indicating whether or not an existing standard-compliant terminal is connected to the base station in the band (frequency band) identified by the Sub Channel ID is stored in the Legacy Present Flag. The band identification information and the existing standard-compliant terminal connection information configure the 6-GHz band usage situation information.

In this way, each base station AP can notify the other (adjacent) surrounding base stations APs whether an existing standard-compliant terminal is enabled, that is, whether the Greenfield operation (GFO) is made not valid per plurality of bands by transmitting the frame storing therein the 6-GHz band usage situation information to the other (adjacent) surrounding base stations APs.

Furthermore, the base station AP receiving the frame from the other surrounding base stations APs is intended to make effective use of the band by performing the Greenfield operation (GFO) while, for example, avoiding bands where an existing standard-compliant terminal is present on the basis of the 6-GHz band usage situation information or by accommodating an existing standard-compliant terminal in the same band as that of the other surrounding base stations APs in a case in which the existing standard-compliant terminal is connected also to (the base station AP) itself.

(Flow of First Example of Processing for Determining 6-GHz Band as Band to be Used in GFO)

A flow of a first example of processing for determining a 6-GHz band as a band to be used in a GFO, executed by (the control section 101 of) the communication device 10 configured as one base station AP will next be described with reference to a flowchart of FIG. 7.

In Step S101, the control section 101 acquires 6-GHz band usage situation information from the surrounding base stations APs.

For example, (the control section 101 of) the base station AP2 receives (the frame (FIG. 6) storing therein) the 6-GHz band usage situation information transmitted from each of the base stations AP1 and AP3 installed to surround the base station AP2, and acquires the 6-GHz band usage situation information. This 6-GHz band usage situation information includes the band identification information (Sub Channel ID) and the existing standard-compliant terminal connection information (Legacy Present Flag).

Figure 8:
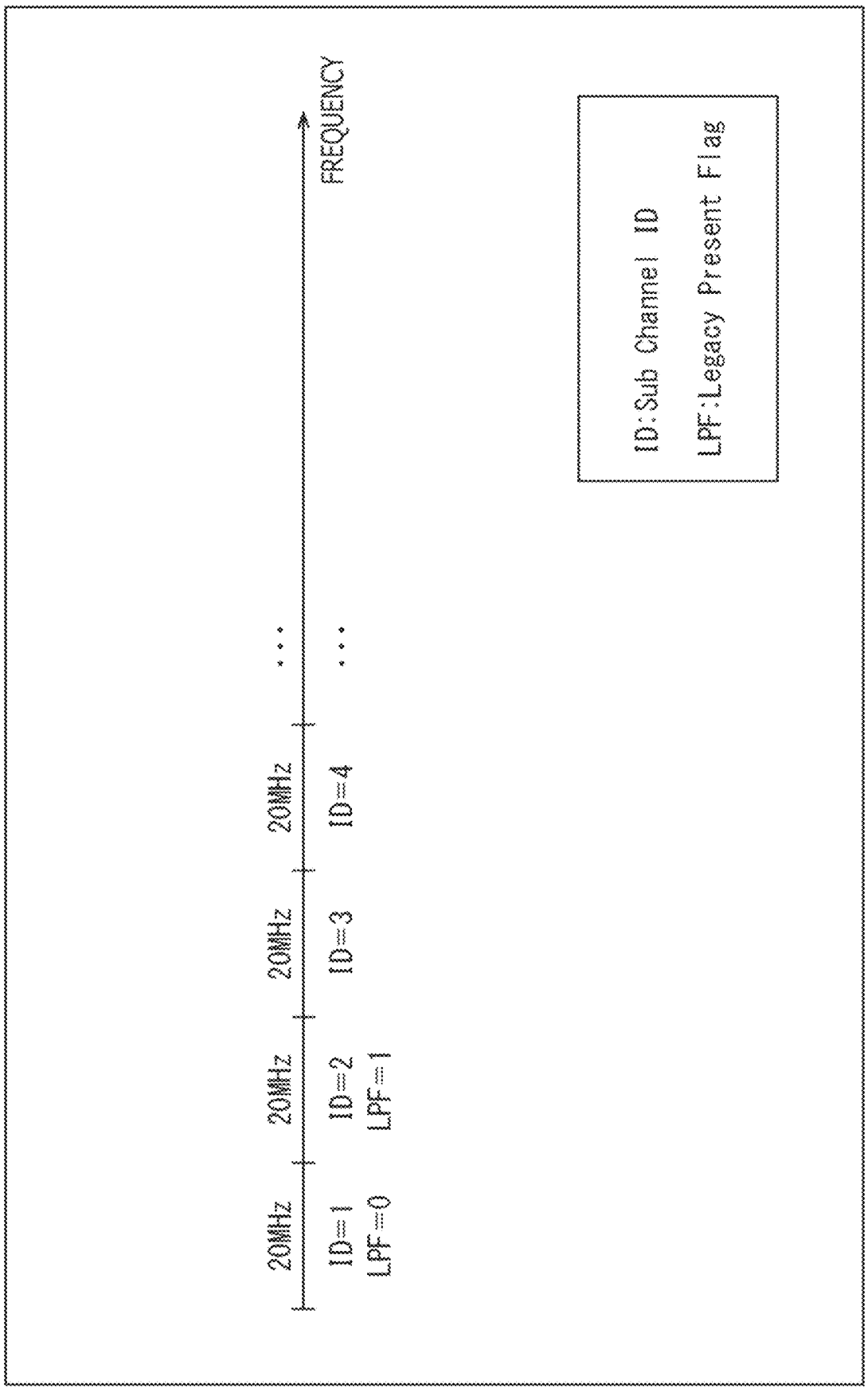
FIG. 8 is a diagram depicting a relation between a Sub Channel ID and a Legacy Present Flag.

FIG. 8 is a diagram depicting a relation between the Sub Channel ID and the Legacy Present Flag.

As depicted in FIG. 8, in the 6-GHz band, Sub Channel ID is allocated per bandwidth that is, for example, 20 MHz. Each base station AP transmits the 6-GHz band usage situation information that includes the Sub Channel ID identifying a predetermined band and the Legacy Present Flag that indicates whether an existing standard-compliant terminal is connected to the base station AP in the band to the other base stations APs.

As this Legacy Present Flag, "1" is set in a case, for example, in which the existing standard-compliant terminal is connected to the base station AP in the band identified by the Sub Channel ID, and "0" is set in a case in which the existing standard-compliant terminal is not connected thereto.

While FIG. 8 exemplarily depicts a case in which one Sub Channel ID is allocated per bandwidth that is 20 MHz, the present technology is not limited to the case. For example, one Sub Channel ID may be allocated per bandwidth that is, for example, 40 MHz corresponding to two channels, and one Legacy Present Flag may be made to correspond to the Sub Channel ID.

Description will be given back to FIG. 7. In Step S102, the control section 101 determines whether a 6-GHz band not used by any of the surrounding base stations APs is present on the basis of the acquired 6-GHz band usage situation information.

In a case in which determination for a determination condition is affirmative in Step S102 ("YES" in S102), the processing goes to Step S103.

In Step S103, the control section 101 controls actions of the sections in such a manner that the 6-GHz not used by the surrounding base stations APs is used in the Greenfield operation (GFO).

It is supposed herein that (the control section 101 of) the base station AP2 determines the 6-GHz band as a band to be used in the GFO on the basis of the 6-GHz band usage situation information acquired from the base stations AP1 and AP3 installed to surround the base station AP2, as depicted in, for example, FIG. 9.

In this case, when an A band depicted in FIG. 9 is present as a 6-GHz candidate band, the A band is a 6-GHz band not used by the base stations AP1 and AP3; thus, (the control section 101 of) the base station AP2 determines the unused 6-GHz band as a band to be used by the base station AP2 (an available frequency band, or hereinafter also referred to as an available band). Furthermore, (the control section 101 of) the base station AP2 performs the Greenfield operation (GFO) using the determined available band (unused 6-GHz band) ("YES" in S102 and S103).

Moreover, in a case in which determination for the determination condition is negative in Step S102 ("NO" in S102), the processing goes to Step S104.

In Step S104, the control section 101 determines whether the 6-GHz band not used by the surrounding base stations APs or used in the Greenfield operation (GFO) is present on the basis of the acquired 6-GHz band usage situation information.

In a case in which determination for a determination condition is affirmative in Step S104 ("YES" in S104), the processing goes to Step S105.

In Step S105, the control section 101 uses the 6-GHz band not used by the surrounding base stations APs or used in the Greenfield operation (GFO), in the Greenfield operation (GFO).

When a B band (6-GHz candidate band) depicted in FIG. 9, for example, is present herein, the B band is a 6-GHz band not used by the base station AP1 and used by the base station AP3 in the Greenfield operation (GFO); thus, (the control section 101 of) the base station AP2 performs the Greenfield operation (GFO) using the 6-GHz band ("YES" in S104, and S105).

It is noted that, at this time, the base station AP2 may perform the Greenfield operation (GFO) using a 6-GHz band used by the base station AP1 as well as the base station AP3 in the Greenfield operation (GFO).

Furthermore, in a case in which the determination for the determination condition is negative in Step S104 ("NO" in S104), the processing goes to Step S106.

In Step S106, the control section 101 determines whether a 6-GHz band used by the surrounding base stations APs or used in a non-Greenfield operation (non-GFO) is present on the basis of the acquired 6-GHz band usage situation information.

In a case in which determination for a determination condition is affirmative in Step S106 ("YES" in S106), the processing goes to Step S107.

In Step S107, the control section 101 uses the 6-GHz band not used by the surrounding base stations APs or used in the non-Greenfield operation (non-GFO), in the non-Greenfield operation (non-GFO).

When a C band (6-GHz candidate band) depicted in FIG. 9, for example, is present herein, the C band is a 6-GHz band not used by the base station AP1 and used by the base station AP3 in the non-Greenfield operation (non-GFO); thus, (the control section 101 of) the base station AP2 performs the non-Greenfield operation (non-GFO) using the 6-GHz band ("YES" in S106, and in S107).

It is noted that, at this time, the base station AP2 may perform the non-Greenfield operation (non-GFO) using a 6-GHz band used by the base station AP1 as well as the base station AP3 in the non-Greenfield operation (non-GFO).

Furthermore, in a case in which the determination for the determination condition is negative in Step S106 ("NO" in S106), the processing goes to Step S108.

In Step S108, the control section 101 selects a band to be used from among 6-GHz candidate bands, and uses the selected band (available band) in the non-Greenfield operation (non-GFO).

When a D band (6-GHz candidate band) depicted in FIG. 9, for example, is present herein, the D band is a 6-GHz band used by the base station AP1 in the Greenfield operation (GFO) and used by the base station AP3 in the non-Greenfield operation (non-GFO); thus, (the control section 101 of) the base station AP2 performs the non-Greenfield operation (non-GFO) using the 6-GHz band ("NO" in S106, and S108).

Figure 7:
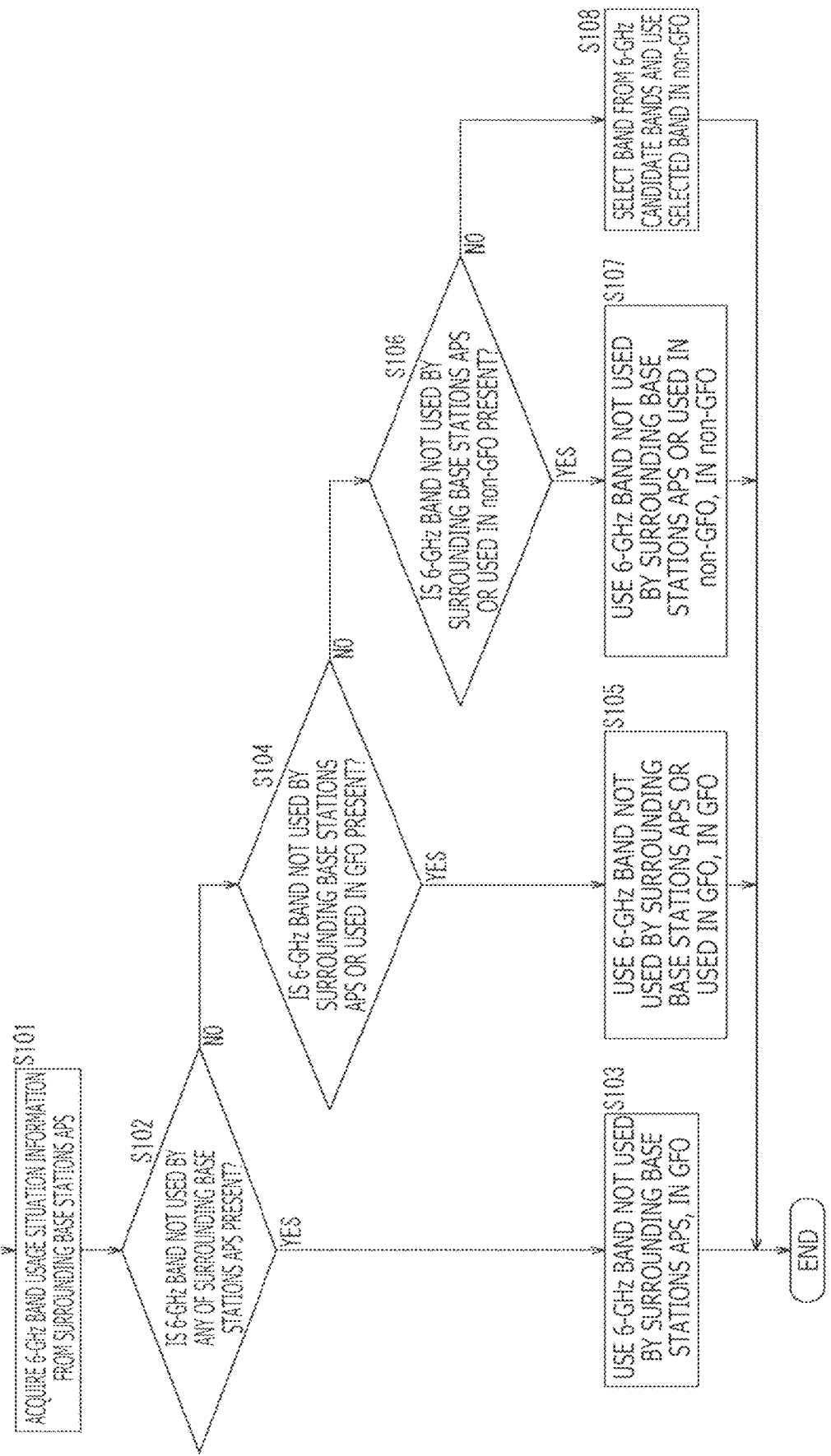
FIG. 7 is a flowchart illustrating a first example of processing for determining a 6-GHz band as a band to be used in a GFO.

When the processing in Step S103, S105, S107, or S108 is over, the processing depicted in FIG. 7 is ended.

The flow of the first example of the processing for determining the 6-GHz band as a band to be used in the GFO, executed by the communication device 10 configured as one base station AP has been described so far.

In this first example of the processing for determining the 6-GHz band as a band to be used in the GFO, the intended base station AP (for example, base station AP2) that acquires the 6-GHz band usage situation information from the surrounding base stations APs (for example, base stations AP1 and AP3) searches a 6-GHz band not used by any of the surrounding base stations APs, and uses the band in the Greenfield operation (GFO) (S103) in a case in which an unused band is present ("YES" in S102).

Furthermore, the intended base station AP (for example, base station AP2) searches a 6-GHz band not used by the surrounding base stations AP or used in the Greenfield operation (GFO) in a case in which all 6-GHz bands (6-GHz candidate bands) are used by at least one surrounding base station AP (for example, base station AP3) ("NO" in S102), and uses the band in the Greenfield operation (GFO) (S105) in a case in which such a 6-GHz band is present ("YES" in S104).

Moreover, in a case in which at least one surrounding base station AP (for example, base station AP3) is existing standard-compliant terminal-enabled in all 6-GHz bands (6-GHz candidate bands) ("YES" or "NO" in S106), the intended base station AP (for example, base station AP2), itself, is incapable of executing the Greenfield operation (GFO) in light of a probability of presence of an existing standard-compliant terminal in the bands (S107 and S108). In other words, in the case of presence of an existing standard-compliant terminal in an available band, the intended base station AP acts in a mode compatible with the existing standard-compliant terminal (acts compatibly).

At this time, the intended base station AP (for example, base station AP2) preferably selects a band where the surrounding base stations AP are not executing the Greenfield operation (GFO) ("YES" in S106, and S107) since a non-Greenfield operation (non-GFO) influences even the surrounding base stations AP executing the Greenfield operation (GFO) in an intended band when the intended base station AP, itself, executes the non-Greenfield operation (non-GFO) (since mixture of the GFO and the non-GFO is unfavorable).

Furthermore, since the framework for the coexistence with an existing standard-compliant terminal in the 6-GHz band is unnecessary overhead in the standard succeeding IEEE802.11ax, it is predicted that a Greenfield operation (GFO) which makes the framework unnecessary is performed, as already described above.

In contrast, in the processing for determining the 6-GHz band as a band to be used in the GFO described above, information (6-GHz band usage situation information) as to whether an existing standard-compliant terminal (terminal compliant with standard IEEE802.11ax) is present (and further, in a case in which the existing standard-compliant terminal is present, information as to which channel where the existing standard-compliant terminal is present is) is shared among the adjacent base stations APs, a channel (6-GHz candidate band) where the existing standard-compliant terminal (terminal compliant with standard IEEE802.11ax) is preferably not present is searched, and the Greenfield operation (GFO) is performed.

By this processing, even in the case of using the PPDU which adopts the format of the GF PPDU depicted in FIG. 5 and to which the L-STF, the L-LTF, the L-SIG, and RL-SIG defined in IEEE802.11ax are not added, the Greenfield operation (GFO) is performed in a channel (6-GHz candidate band) where the existing standard-compliant terminal (terminal compliant with standard IEEE802.11ax) is not present; thus, it is possible to avoid an event, for example, that the terminal compliant with standard IEEE802.11ax that is incapable of correctly recognizing the GF PPDU receives a GF PPDU and induces a packet collision.

As a result, at the time of allocating a new frequency band (for example, 6-GHz band), the wireless LAN system is capable of realizing efficient communication excluding unnecessary signal regions for coexistence (for example, the L-STF, the L-LTF, the L-SIG, and the RL-SIG defined in IEEE802.11ax and not added to the GF PPDU).

(Flow of Second Example of Processing for Determining 6-GHz Band as Band to Be Used in GFO)

Figure 10:
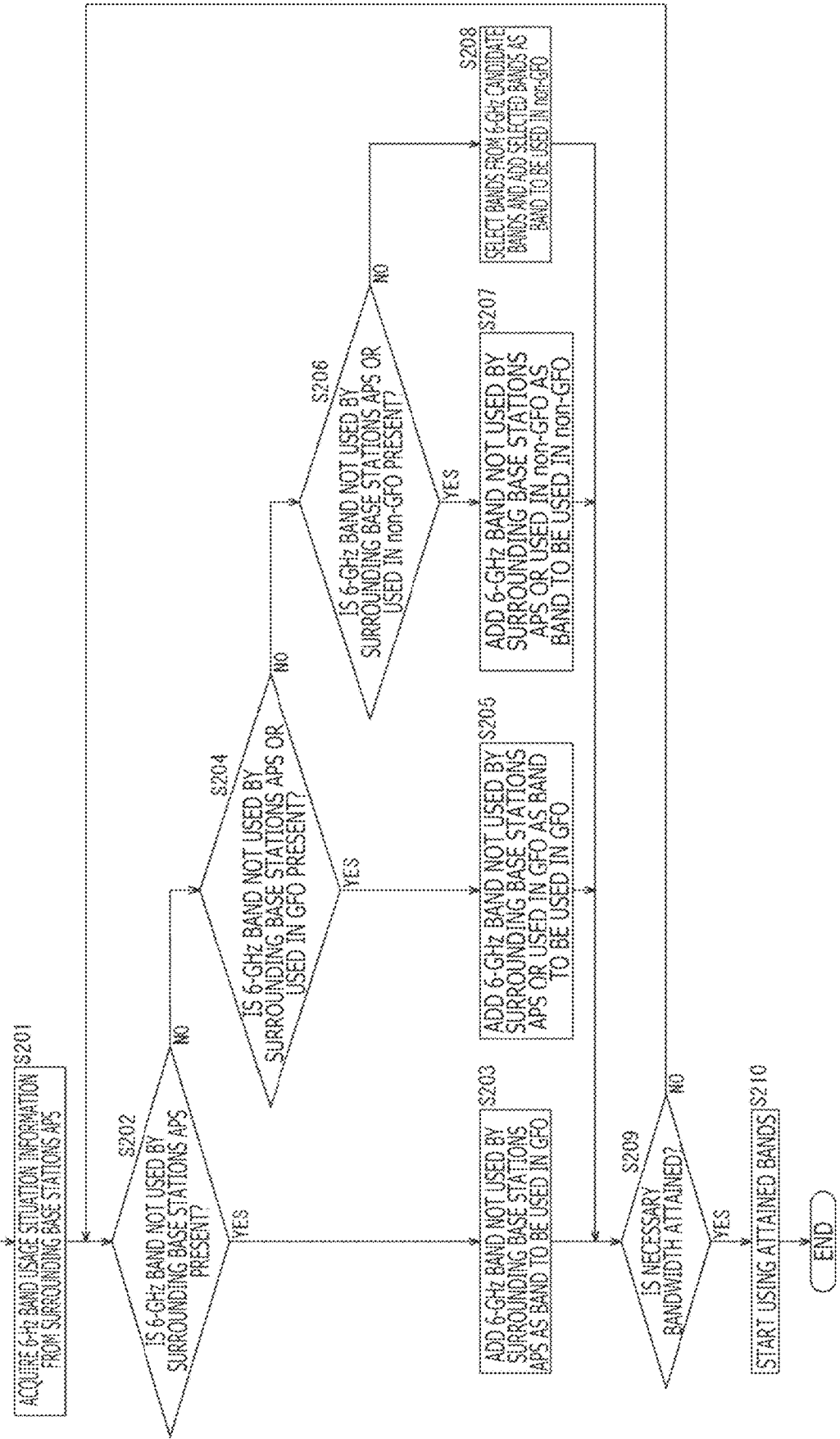
FIG. 10 is a flowchart illustrating a second example of processing for determining a 6-GHz band as a band to be used in the GFO.

FIG. 10 is a flowchart illustrating a second example of the processing for determining the 6-GHz band as a band to be used in the GFO, executed by (the control section 101 of) the communication device 10 configured as one base station AP.

In Step S201, similarly to Step S101 of FIG. 7, the 6-GHz band usage situation information is acquired from the surrounding base stations APs.

In Steps S202 to S208, similarly to Steps S102 to S108 of FIG. 7, the control section 101 performs determination processing based on the 6-GHz band usage situation information acquired from the surrounding base stations APs and determines an available band used in either the Greenfield operation (GFO) or the non-Greenfield operation (non-GFO) from 6-GHz candidate bands. In the second example, not one band (6-GHz candidate band) but a plurality of bands (6-GHz candidate bands) is selected as available bands.

In other words, when the processing in Step S203, S205, S207, or S208 is over, the processing goes to Step S209. In Step S209, the control section 101 determines whether a necessary bandwidth is attained by the 6-GHz bands added by the processing in Step S203, S205, S207, or S208.

In a case in which the control section 101 determines that a necessary bandwidth is not attained in Step S209, the processing returns to Step S202, and the processing in Steps S202 to S208 is repeated.

In this example, by repeating the processing in Steps S202 to S208, in a case in which, for example, there is need to attain a bandwidth of 40 MHz, when a bandwidth of 20 MHz can be attained in a first loop, a 6-GHz band corresponding to an insufficient bandwidth is attained by adding a remaining bandwidth of 20 MHz in a second loop, for example.

It is noted that, while loop processing in Steps S202 to S208 is repeated until completion of attainment of the necessary bandwidth, a band additionally selected in second and following loops may be selected in accordance with a predetermined condition by, for example, preferentially selecting a band close to a band selected first in the first loop (selected band) at a time of repetition.

In a case in which the control section 101 determines in Step S209 that a necessary bandwidth is attained, the processing goes to Step S210.

In Step S210, the control section 101 controls actions of the sections in such a manner as that the available band attained by the loop processing in Steps S202 to S208 is used in either the Greenfield operation (GFO) or the non-Greenfield operation (non-GFO).

When processing in Step S210 is over, the processing depicted in FIG. 10 is ended.

The flow of the second example of the processing for determining the 6-GHz band as a band to be used in the GFO, executed by the communication device 10 configured as one base station AP has been described so far.

(Report of 6-GHz Band Usage Situation Information by Subordinate Terminal)

Figure 11:
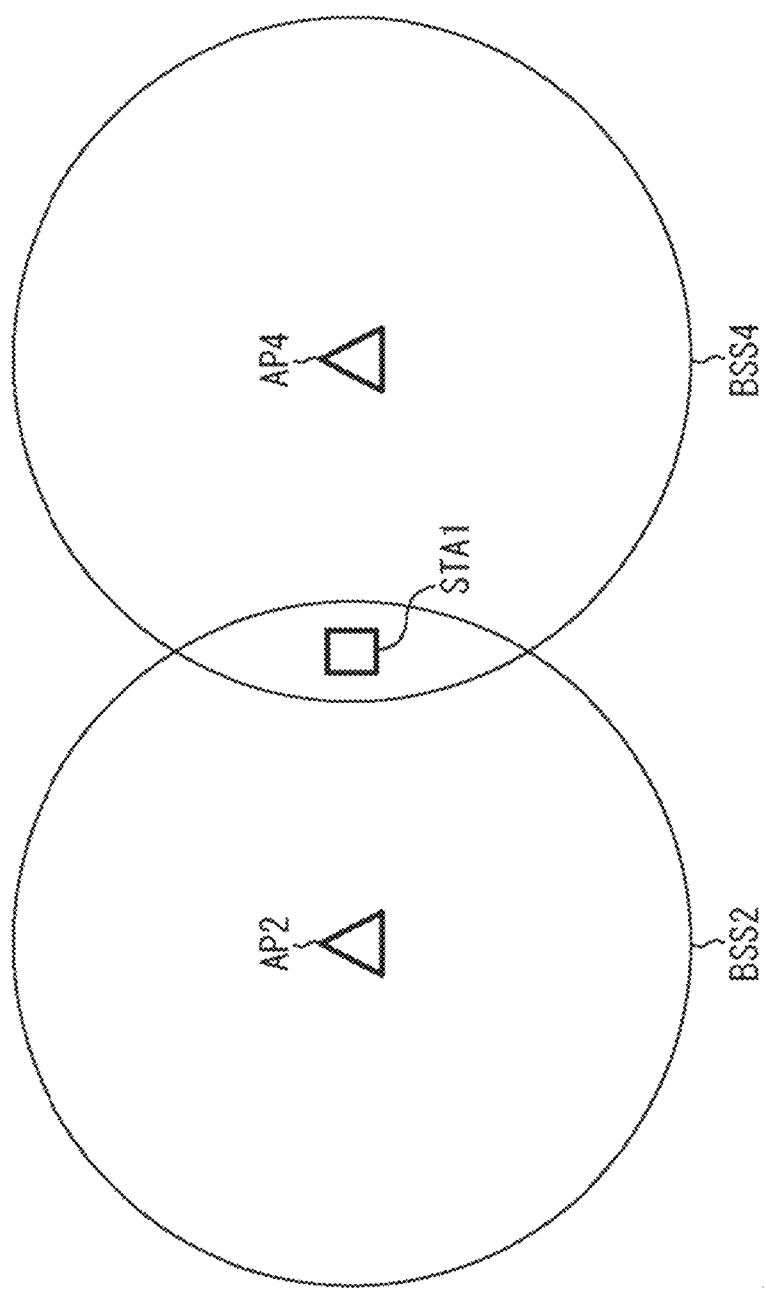
FIG. 11 is a diagram depicting another example of configurations of the wireless communication system.

In FIG. 11, a case, for example, in which a subordinate terminal STA1 is connected to the base station AP2 but not connected to a base station AP4 is supposed.

At this time, in a case of receiving (monitoring) 6-GHz band usage situation information from the base station AP4 to which the subordinate terminal STA1 is not connected, the subordinate terminal STA1 can transmit (report) the received 6-GHz band usage situation information to the base station AP2 to which the subordinate terminal STA1 is connected.

It is to be noted that, conversely from description given above, in a case of receiving (monitoring) 6-GHz band usage situation information from the base station AP2 to which the subordinate terminal STA1 is connected, the subordinate terminal STA1 may transmit (report) the 6-GHz band usage situation information to the base station AP4 to which the subordinate terminal STA1 is not connected.

In this way, even in a case in which the base stations AP2 and AP4 are incapable of directly communicating information with each other, using the subordinate terminal STA1 present in a location in which the subordinate terminal STA1 is connectable to those base stations AP2 and AP4 enables the base stations AP2 and AP4 to communicate the 6-GHz band usage situation information with each other.

Figure 12:
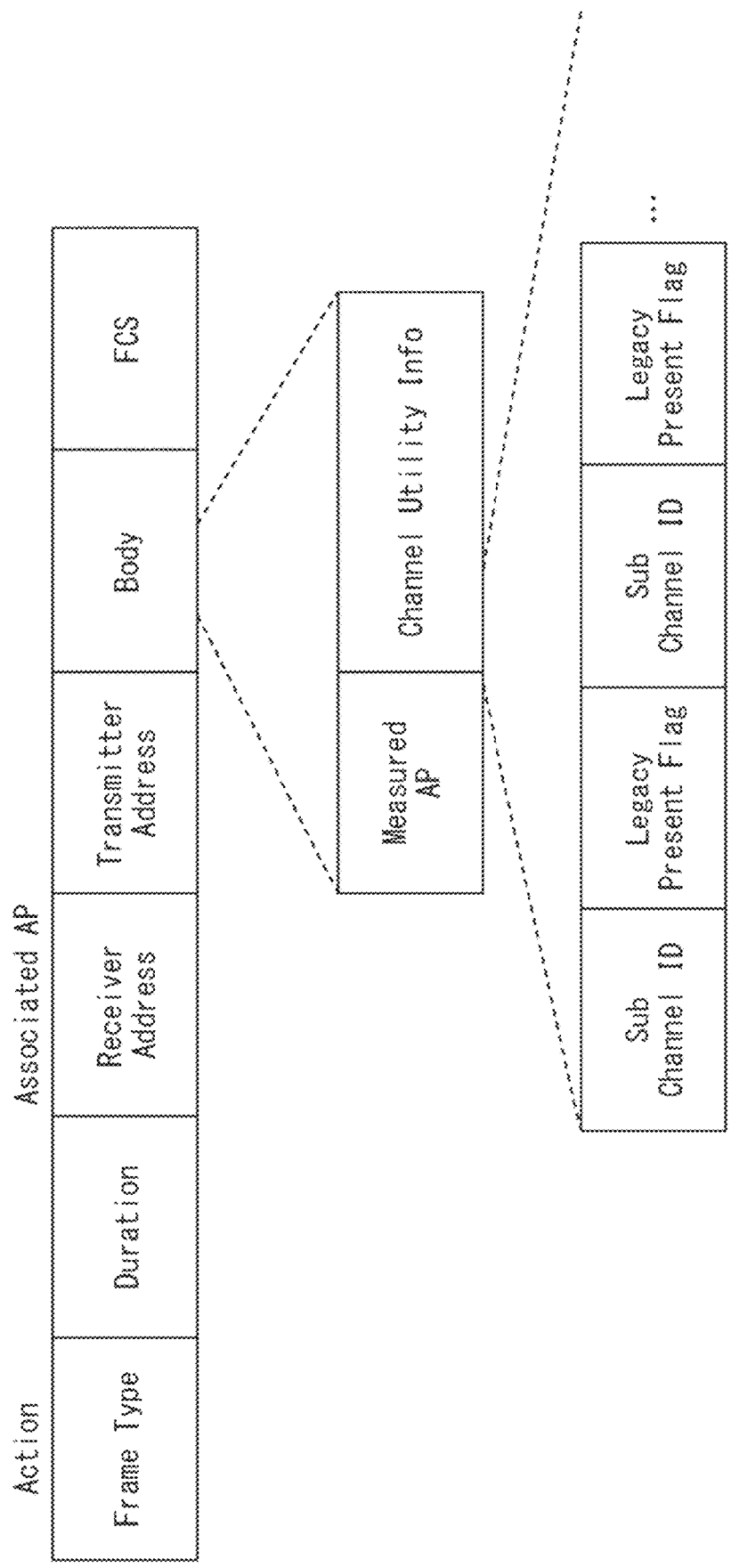
FIG. 12 is a diagram depicting a second example of the format of the frame in which the 6-GHz band usage situation information is stored.

FIG. 12 is a diagram depicting a second example of the format of the frame in which information associated with whether an existing standard-compliant terminal is enabled in a 6-GHz band is stored.

In FIG. 12, the frame storing therein the 6-GHz band usage situation information includes the Frame Type, the Duration, the Receiver Address, the Transmitter Address, the Body, and the FCS. It is noted that, since the Frame Type, the Duration, the Receiver Address, the Transmitter Address, and the FCS are similar to those included in the frame of FIG. 6 described above, description thereof will be omitted herein as appropriate.

In a case, however, in which this frame is transmitted as an Action Frame that is, for example, a Radio Measurement Report, information indicating Action is stored in the Frame Type as the information associated with the type of this frame. Furthermore, for example, an address of a base station AP (Associated AP) to which a report is transmitted is stored in the Receiver Address as the information associated with the address of the destination of this frame.

The Body includes a Measured AP and Channel Utility Info. Information regarding a base station AP is stored in the Measured AP. The Channel Utility Info includes the Sub Channel ID storing therein the band identification information and the Legacy Present Flag storing therein the existing standard-compliant terminal connection information. The band identification information and the existing standard-compliant terminal connection information configure the 6-GHz band usage situation information.

In this way, in a case of receiving (monitoring) a beacon frame (for example, the frame of FIG. 6) including the 6-GHz band usage situation information from the base station AP (for example, the base station AP4) to which a subordinate terminal STA (for example, the subordinate terminal STA1) that is a terminal station is not connected, the subordinate terminal STA can generate a report frame (for example, the frame of FIG. 12) including the 6-GHz band usage situation information on the basis of information stored in the received frame and can report the information to the base station AP (for example, the base station AP2) to which the subordinate terminal STA is connected.

In this way, the subordinate terminal STA (for example, the subordinate terminal STA1) that is the terminal station transmits the frame for reporting the 6-GHz band usage situation information regarding the base station AP (for example, the base station AP4) to which the subordinate terminal STA is not connected, to the base station AP (for example, the base station AP2) to which the subordinate terminal STA is connected, as depicted in FIG. 12, whereby even in a state in which the base stations APs (for example, the base stations AP2 and AP4) are incapable of direct communication, the base stations APs can acquire (obtain) mutual 6-GHz band usage situation information via the subordinate terminal STA.

A flow of processing for reporting 6-GHz band usage situation information, executed by (the control section 101 of) the communication device 10 configured as one subordinate terminal STA will next be described with reference to a flowchart of FIG. 13.

In Step S301, the control section 101 determines whether (a beacon frame including) 6-GHz band usage situation information is received (monitored) from a base station AP to which the subordinate terminal STA is not connected.

In a case in which the control section 101 determines in Step S301 that the 6-GHz band usage situation information is received (monitored), the processing goes to Step S302.

In Step S302, the control section 101 transmits (reports) (a report frame including) the received 6-GHz band usage situation information to the base station AP to which the subordinate terminal STA is connected.

Figure 13:
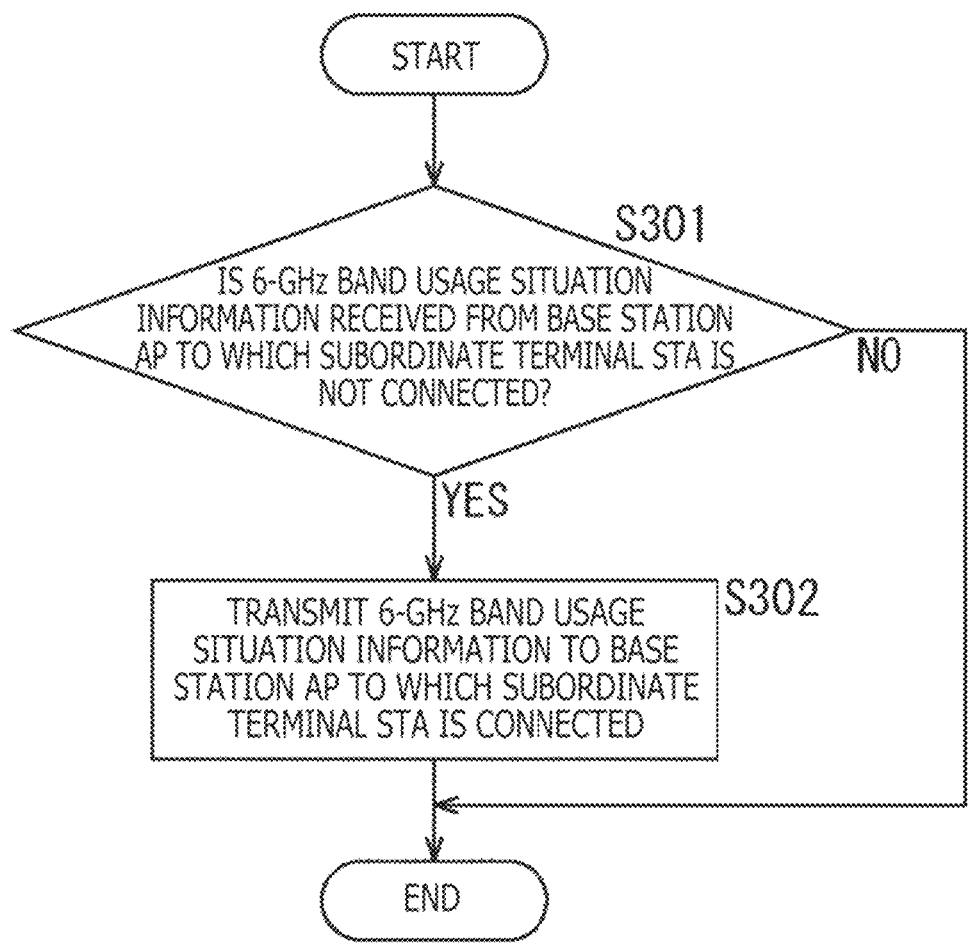
FIG. 13 is a flowchart illustrating a processing for reporting 6-GHz band usage situation information.

When processing in Step S302 is over, the processing depicted in FIG. 13 is ended. It is noted that, in a case in which the control section 101 determines in Step S301 that the 6-GHz band usage situation information is not received (monitored), the processing in Step S302 is skipped and the processing depicted in FIG. 13 is ended.

The flow of the processing for reporting the 6-GHz band usage situation information, executed by the communication device 10 configured as one subordinate terminal STA has been described so far.

2. Modifications (Other Examples of Configurations)

While it has been described above that the control section 101 (FIG. 2) in the communication device 10 (FIG. 2) exercises control to allow efficient communication at the time of allocation of a new frequency band (for example, a 6-GHz band), a communication section 103 configured as a communication device such as a communication module or a communication chip may have this control function.

Figure 14:
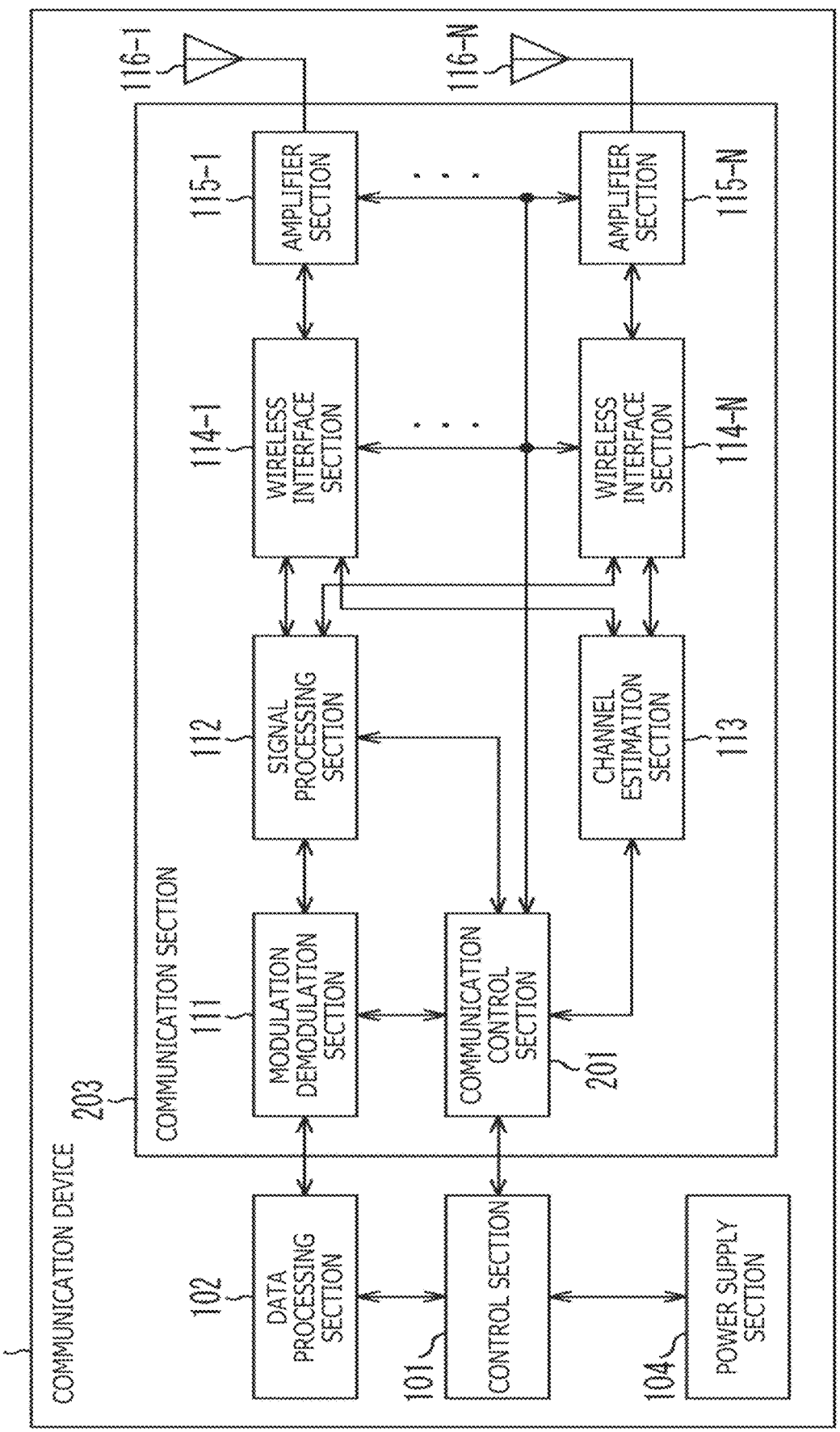
FIG. 14 is a block diagram depicting another example of configurations of a communication device according to one embodiment to which the present technology is applied.
Figure 15:
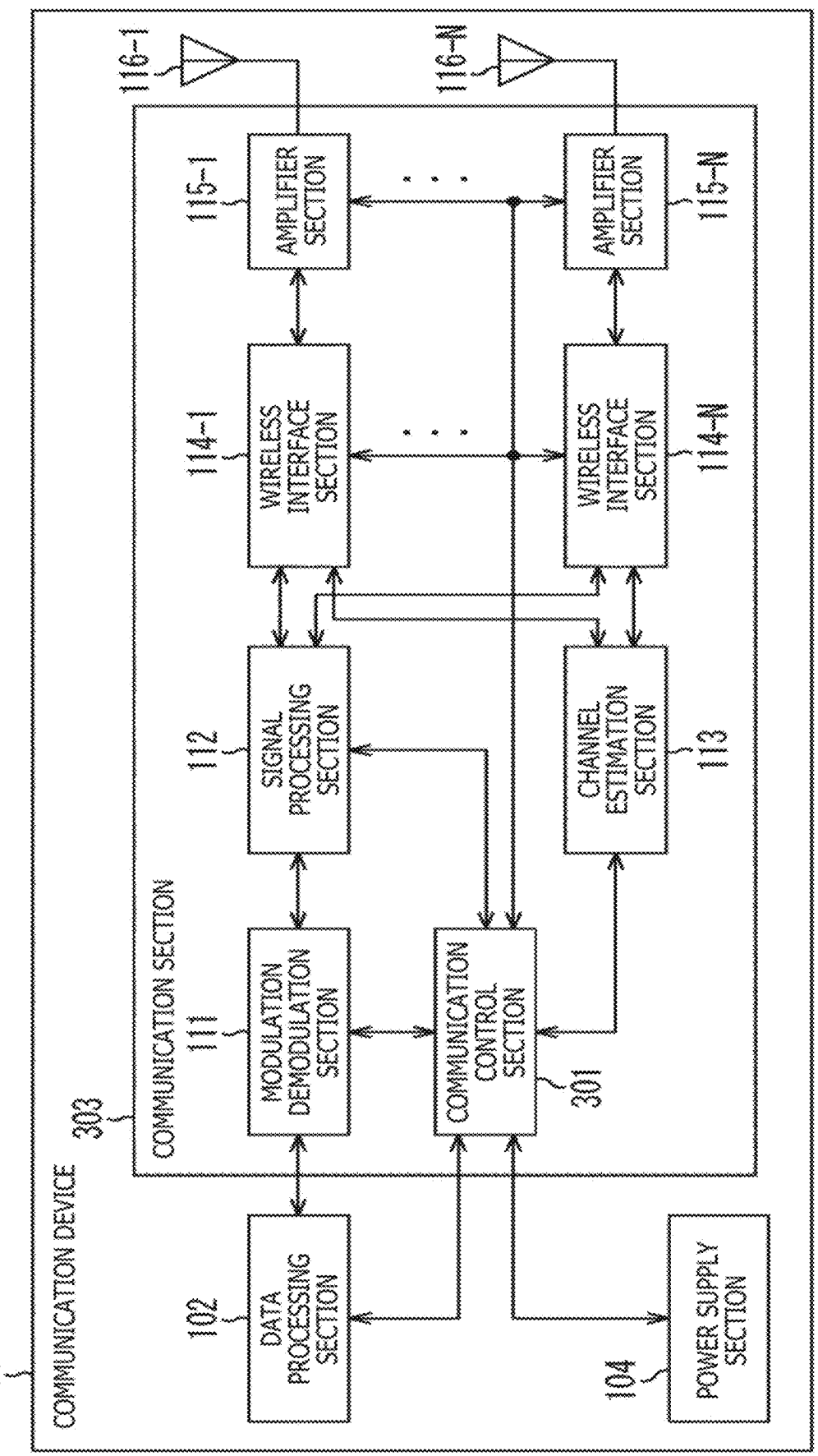
FIG. 15 is a block diagram depicting another example of configurations of a communication device according to one embodiment to which the present technology is applied.

FIGS. 14 and 15 are block diagrams depicting other examples of configurations of a communication device (wireless communication device) according to one embodiment to which the present technology is applied.

In FIG. 14, a communication device 20 is configured such that a communication section 203 is provided as an alternative to the communication section 103, compared with the communication device 10 depicted in FIG. 2. This communication section 203 is added with a communication control section 201 as well as the modulation demodulation section 111 to the amplifier sections 115. The communication control section 201 has a control function to allow efficient communication at the time of allocation of a new frequency band described above among functions of the control section 101 (FIG. 2). It is noted that the control section 101 of FIG. 14 has the functions except for the control function to allow efficient communication at the time of allocation of a new frequency band described above among the functions of the control section 101 (FIG. 2).

Furthermore, in FIG. 15, a communication device 30 is configured such that the control section 101 is removed and yet, a communication section 303 is provided as an alternative to the communication section 103, compared with the communication device 10 depicted in FIG. 2. This communication section 303 is added with a control section 301 as well as the modulation demodulation section 111 to the amplifier sections 115. The control section 301 has similar functions (all functions including the control function to allow efficient communication at the time of allocation of a new frequency band described above) to those of the control section 101 (FIG. 2).

It is noted that the communication devices 10, 20, and 30 may be each configured as a part (for example, a communication module, a communication chip, or the like) of the device that configures one base station AP or one subordinate terminal STA. Furthermore, the subordinate terminal STA can be configured as an electronic apparatus with a wireless communication function, which is, for example, a smart phone, a tablet terminal, a cellular telephone, a personal computer, a digital camera, a game console, a television receiver, a wearable terminal, or a speaker device.

Furthermore, in the description given above, communication may be not only wireless communication but also communication that is a mixture of wireless communication and wired communication, that is, the communication may be communication held in such a manner that the wireless communication is held in certain sections and the wired communication is held in the other sections. Moreover, the communication may be held in such a manner that communication from one device to the other device is held as the wired communication and communication from the other device to the certain device is held as the wireless communication.

Furthermore, while an example of allocating channels at the same level has been described above, channels may be allocated with a subordination such as a primary channel and a secondary channel at the time of allocation of channels, for example.

It is noted that embodiments of the present technology are not limited to the embodiments described above and various changes can be made without departure from the spirit of the present technology.

Furthermore, the present technology can be configured as follows.

(1)

A communication device including a base station, the communication device including:
    a control section configured to determine whether an existing standard-compliant terminal is connected to the base station in a usage frequency band that is a frequency band to be used by the base station on the basis of existing standard-compliant terminal connection information that indicates whether the existing standard-compliant terminal is connected to the base station in a predetermined frequency band and that is received from another base station.

(2)

The communication device according to (1) above, in which
    the control section determines the usage frequency band and determines whether the existing standard-compliant terminal is connected to the base station in the usage frequency band on the basis of band identification information that identifies the predetermined frequency band and that is received from the other base station and the existing standard-compliant terminal connection information.

(3)

The communication device according to (2) above, in which
    the control section controls a first operation including an operation in which the existing standard-compliant terminal is not present, using the usage frequency band on the basis of a result of determination.

(4)

The communication device according to (3) above, in which
    the control section controls, in a case of determining a frequency band that is not used by the other base station as the usage frequency band, the first operation using the determined usage frequency band.

(5)

The communication device according to (3) or (4) above, in which
    the control section controls, in a case of determining a frequency band that is either not used by the other base station or used by the other base station in the first operation as the usage frequency band, the first operation using the determined usage frequency band.

(6)

The communication device according to any one of (3) to (5) above, in which
    the control section controls a second operation including an operation in which the existing standard-compliant terminal is present, using the usage frequency band on the basis of a result of determination.

(7)

The communication device according to (6), in which
    the control section controls, in a case of determining a frequency band that is either not used by the other base station or used by the other base station in the second operation as the usage frequency band, the second operation using the determined usage frequency band.

(8)

The communication device according to (6) or (7) above, in which
    the control section controls, in a case of determining a frequency band that is either used by the other base station in the first operation or used by the other base station in the second operation as the usage frequency band, the second operation using the determined usage frequency band.

(9)

The communication device according to any one of (2) to (8) above, in which
    the control section repeats selection of frequency bands to be used as the usage frequency band until a necessary bandwidth for the usage frequency band is attained, and sequentially adds the selected frequency bands to the usage frequency band.

(10)

The communication device according to (9) above, in which
the control section preferentially selects a frequency band close to a selected frequency band at a time of selecting the frequency bands to be used as the usage frequency band.

(11)
The communication device according to any one of (2) to (10) above, in which
the band identification information and the existing standard-compliant terminal connection information are included in a beacon frame that is broadcast transmitted from the other base station.

(12)
The communication device according to (11) above, in which
one or a plurality of pairs of the band identification information and the existing standard-compliant terminal connection information are stored in the beacon frame.

(13)
The communication device according to any one of (1) to (12) above, in which
the predetermined frequency band is included in a newly allocated frequency band in a wireless communication system.

(14)
The communication device according to any one of (2) to (12) above, in which
the control section exercises control in such a manner that the band identification information and the existing standard-compliant terminal connection information associated with the base station are transmitted to the other base station.

(15)
A communication method including:
by a communication device including a base station,
determining whether an existing standard-compliant terminal is connected to the base station in a usage frequency band that is a frequency band to be used by the base station on the basis of existing standard-compliant terminal connection information that indicates whether the existing standard-compliant terminal is connected to the base station in a predetermined frequency band and that is received from another base station.

(16)
A communication device including a subordinate terminal connected to a base station, the communication device including:
a control section configured to exercise control in such a manner that existing standard-compliant terminal connection information that indicates whether an existing standard-compliant terminal is connected to the base station in a predetermined frequency band and that is received from another base station is transmitted to the base station.

(17)
The communication device according to (16) above, in which
the control section exercises control in such a manner that band identification information that identifies the predetermined frequency band and that is received from the other base station and the existing standard-compliant terminal connection information are transmitted to the base station.

(18)
The communication device according to (17) above, in which
the band identification information and the existing standard-compliant terminal connection information are transmitted while being included in a report frame to be transmitted to the base station, and
one pair or a plurality of pairs of the band identification information and the existing standard-compliant terminal connection information are stored in the report frame.

(19)
The communication device according to (17) or (18) above, in which
the band identification information and the existing standard-compliant terminal connection information are received while being included in a beacon frame that is broadcast transmitted from the other base station, and
one pair or a plurality of pairs of the band identification information and the existing standard-compliant terminal connection information are stored in the beacon frame.

(20)
A communication method including:
by a communication device including a subordinate terminal connected to a base station,
exercising control in such a manner that existing standard-compliant terminal connection information that indicates whether an existing standard-compliant terminal is connected to the base station in a predetermined frequency band and that is received from another base station is transmitted to the base station.

REFERENCE SIGNS LIST

10, 20, 30: Communication device
101: Control section
102: Data processing section
103: Communication section
104: Power supply section
111: Modulation demodulation section
112: Signal processing section
113: Channel estimation section
114, 114-1 to 114-N: Wireless interface section
115, 115-1 to 115-N: Amplifier section
116, 116-1 to 116-N: Antenna
201: Communication control section
203: Communication section
301: Control section
303: Communication section
AP: Base station
BSS: Network
STA: Subordinate terminal

The invention claimed is:
1. A communication control device comprising:
control circuitry configured to:
receive, from a second base station, existing standard-compliant terminal connection information that indicates whether an existing standard-compliant terminal is connected to the second base station in a predetermined frequency band;
determine, based on the received terminal connection information, whether an existing standard-compliant terminal is connected to the second base station in a usage frequency band to be used by a first base station; and control operation of the first base station based on the determination of whether an existing standard-compliant terminal is connected to the second base station in the usage frequency band.

2. The communication control device according to claim 1, wherein
the control circuitry is configured to determine the usage frequency band and to determine whether the existing standard-compliant terminal is connected to the second base station in the usage frequency band on a basis of band identification information that identifies the predetermined frequency band and that is received from the second base station and the existing standard-compliant terminal connection information.

3. The communication control device according to claim 2, wherein
the control circuitry is configured to control a first operation including an operation in which the existing standard-compliant terminal is not present, using the usage frequency band on a basis of a result of determination.

4. The communication control device according to claim 3, wherein
the control circuitry is configured to control, in a case of determining a frequency band that is not used by the second base station as the usage frequency band, the first operation using the determined usage frequency band.

5. The communication control device according to claim 3, wherein
the control circuitry is configured to control, in a case of determining a frequency band that is either not used by the second base station or used by the second base station in the first operation as the usage frequency band, the first operation using the determined usage frequency band.

6. The communication control device according to claim 3, wherein
the control circuitry is configured to control a second operation including an operation in which the existing standard-compliant terminal is present, using the usage frequency band on a basis of a result of determination.

7. The communication control device according to claim 6, wherein
the control circuitry is configured to control, in a case of determining a frequency band that is either not used by the second base station or used by the second base station in the second operation as the usage frequency band, the second operation using the determined usage frequency band.

8. The communication control device according to claim 6, wherein
the control circuitry is configured to control, in a case of determining a frequency band that is either used by the second base station in the first operation or used by the second base station in the second operation as the usage frequency band, the second operation using the determined usage frequency band.

9. The communication control device according to claim 2, wherein
the control circuitry is configured to repeat selection of frequency bands to be used as the usage frequency band until a necessary bandwidth for the usage frequency band is attained, and to sequentially add the selected frequency bands to the usage frequency band.

10. The communication control device according to claim 9, wherein
the control circuitry is configured to preferentially select a frequency band close to a selected frequency band at a time of selecting the frequency bands to be used as the usage frequency band.

11. The communication control device according to claim 2, wherein
the band identification information and the existing standard-compliant terminal connection information are included in a beacon frame that is broadcast transmitted from the second base station.

12. The communication control device according to claim 11, wherein
one or a plurality of pairs of the band identification information and the existing standard-compliant terminal connection information are stored in the beacon frame.

13. The communication control device according to claim 2, wherein
the control circuitry is configured to exercise control in such a manner that the band identification information and the existing standard-compliant terminal connection information associated with the first base station are transmitted to the second base station.

14. The communication control device according to claim 1, wherein
the predetermined frequency band is included in a newly allocated frequency band in a wireless communication system.

15. The communication control device according to claim 1, wherein the control circuitry is included in the first base station.

16. A communication method comprising:
by a communication control device,
receiving, from a second base station, existing standard-compliant terminal connection information that indicates whether an existing standard-compliant terminal is connected to the second base station in a predetermined frequency band;
determining, based on the received terminal connection information, whether an existing standard-compliant terminal is connected to the second base station in a usage frequency band to be used by a first base station; and
controlling operation of the first base station based on the determination of whether an existing standard-compliant terminal is connected to the second base station in the usage frequency band.

17. A communication control device comprising:
control circuitry configured to:
receive, from a second base station, existing standard-compliant terminal connection information that indicates whether an existing standard-compliant terminal is connected to the second base station in a predetermined frequency band; and
transmit the received terminal connection information to a first base station, wherein the first base station is configured to control operation based on the transmitted terminal connection information.

18. The communication control device according to claim 17, wherein
the control circuitry is configured to exercise control in such a manner that band identification information that identifies the predetermined frequency band and that is received from the second base station and the existing standard-compliant terminal connection information are transmitted to the first base station.

19. The communication control device according to claim 18, wherein
- the band identification information and the existing standard-compliant terminal connection information are transmitted while being included in a report frame to be transmitted to the first base station, and
- one pair or a plurality of pairs of the band identification information and the existing standard-compliant terminal connection information are stored in the report frame.

20. The communication control device according to claim 19, wherein
- the band identification information and the existing standard-compliant terminal connection information are received while being included in a beacon frame that is broadcast transmitted from the second base station, and
- one pair or a plurality of pairs of the band identification information and the existing standard-compliant terminal connection information are stored in the beacon frame.

* * * * *